US007709426B2

(12) United States Patent
Eadie et al.

(10) Patent No.: US 7,709,426 B2
(45) Date of Patent: May 4, 2010

(54) SOLID STICK GREASE COMPOSITIONS

(75) Inventors: Don Eadie, Vancouver (CA); John Cotter, Vancouver (CA); Xin Lu, North Vancouver (CA)

(73) Assignee: Kelsan Technologies Corp., North Vancouver, British Columbia ( * ) Notice: Subject to any disclaimer, the term of this patent is extended or adjusted under 35 U.S.C. 154(b) by 704 days.

(21) Appl. No.: 11/428,982

(22) Filed: Jul. 6, 2006

(65) Prior Publication Data
US 2007/0010405 A1  Jan. 11, 2007

Related U.S. Application Data

(60) Provisional application No. 60/697,575, filed on Jul. 8, 2005.

(51) Int. Cl.
*F16C 33/18* (2006.01)
*F16C 33/04* (2006.01)
*F16C 33/20* (2006.01)
*C10L 1/10* (2006.01)

(52) U.S. Cl. ............... 508/482; 508/101; 508/108

(58) Field of Classification Search .............. 508/482, 508/101, 108
See application file for complete search history.

(56) References Cited

U.S. PATENT DOCUMENTS

| 4,575,430 A | 3/1986 | Periard et al. |
|---|---|---|
| 4,753,743 A | 6/1988 | Sech |
| 4,811,818 A | 3/1989 | Jamison |
| 4,915,856 A | 4/1990 | Jamison |
| 5,054,582 A | 10/1991 | Aracil |
| 5,173,204 A | 12/1992 | Chiddick et al. |
| 5,251,724 A | 10/1993 | Szatkowski et al. |
| 5,308,516 A | 5/1994 | Chiddick |
| 5,337,860 A | 8/1994 | Burke et al. |
| 5,435,925 A | 7/1995 | Jamison |
| 5,965,658 A | 10/1999 | Smith et al. |

(Continued)

FOREIGN PATENT DOCUMENTS

EP          0372559          6/1990

(Continued)

OTHER PUBLICATIONS

H. Harrison et al., Recent Developments in COF Measurements at the Rail/Wheel Interface, Proceedings the 5th International Conference on Contact Mechanics and Wear of Rail/Wheel Systems CM 2000 (SEIKEN Symposium No. 27), pp. 30-34.

(Continued)

*Primary Examiner*—Walter D Griffin
*Assistant Examiner*—Frank C Campanell
(74) *Attorney, Agent, or Firm*—Hovey Williams LLP

(57) ABSTRACT

The present invention provides a solid stick composition comprising a thermosetting resin and a grease. Optionally, the solid stick composition may comprise a lubricant, a friction modifier, a thermoplastic plasticizer or a combination thereof. The solid stick compositions may be used for application between two metal surfaces in sliding and rolling-sliding contact such as steel wheel-rail systems including mass transit and freight systems. A method of reducing energy consumption, or controlling friction between a metal surface and a second metal surface by applying the solid stick composition to one or more than one of the metal surfaces, is also provided.

18 Claims, 9 Drawing Sheets

U.S. PATENT DOCUMENTS

| | | | |
|---|---|---|---|
| 5,972,855 | A | 10/1999 | Honary |
| 6,020,063 | A | 2/2000 | Riffle et al. |
| 6,569,816 | B2 * | 5/2003 | Oohira et al. ............... 508/107 |
| 6,641,919 | B1 | 11/2003 | Hayashi et al. |
| 6,649,573 | B2 | 11/2003 | Mitrovich |
| 2003/0101897 | A1 | 6/2003 | Mitrovich et al. |
| 2003/0195123 | A1 | 10/2003 | Cotter |
| 2004/0038831 | A1 | 2/2004 | Eadie |
| 2004/0043908 | A1 | 3/2004 | Mitrovich |
| 2008/0182766 | A1 | 7/2008 | Cotter et al. |

FOREIGN PATENT DOCUMENTS

| | | |
|---|---|---|
| WO | WO9015123 | 12/1990 |
| WO | WO9813445 | 4/1998 |
| WO | 0226919 | 4/2002 |
| WO | WO0226919 | 4/2002 |
| WO | WO2006084386 | 8/2006 |

OTHER PUBLICATIONS

A. Matsumoto et al., Creep Force Characteristics Between Rail and Wheel on Scaled Model, Proceedings the 5th International Conference on Contact Mechanics and Wear of Rail/Wheel Systems CM 2000 (SEIKEN Symposium No. 27), pp. 197-202.

International Search Report dated May 18, 2006 for International Patent Application No. PCT/CA2006/000215, with an International Filing Date of Feb. 14, 2006; Applicant: Kelsan Technologies Corp. et al.; Applicant's Ref. No. 08902409WO.

Office Action dated Jul. 1, 2009 for U.S. Appl. No. 11/698,046, with a U.S. Filing Date of Jan. 26, 2007; Applicant: John Cotter; Applicant's Ref. No. V80898US.

Office Action dated Nov. 20, 2009 re U.S. Appl. No. 11/884,252, filed Oct. 26, 2007, entitled Solid Stick Compositions Comprising Thermosetting Plastic (12 pgs).

* cited by examiner

SOLID STICK GREASE COMPOSITIONS

RELATED APPLICATIONS

This application claims the priority of U.S. Provisional Patent Application Ser. No. 60/697,575, filed Jul. 8, 2005, incorporated by reference herein.

FIELD OF INVENTION

The present invention relates to solid stick compositions for applying to steel surfaces that are in sliding or rolling sliding contact.

BACKGROUND OF THE INVENTION

The control of friction and wear of metal mechanical components that are in sliding or rolling-sliding contact is of great importance in the design and operation of many machines and mechanical systems. For example, many steel-rail and steel-wheel transportation systems including freight, passenger and mass transit systems suffer from the emission of high noise levels and extensive wear of mechanical components such as wheels, rails and other rail components such as ties. The origin of such noise emission, and the wear of mechanical components may be directly attributed to the frictional forces and behaviour that are generated between the wheel and the rail during operation of the system. Furthermore, it has been observed that the control of friction also results in a reduction of lateral forces, and reduction in energy consumption.

In a dynamic system wherein a wheel rolls on a rail, there is a constantly moving zone of contact. For purposes of discussion and analysis, it is convenient to treat the zone of contact as stationary while the rail and wheel move through the zone of contact. When the wheel moves through the zone of contact in exactly the same direction as the rail, the wheel is in an optimum state of rolling contact over the rail. In such a case, no appreciable friction exists between the wheel and the rail. However, because the wheel and the rail are profiled, often misaligned and subject to motions other than strict rolling, the respective velocities at which the wheel and the rail move through the zone of contact are not always the same. This is often observed when fixed-axle railcars negotiate curves wherein true rolling contact can only be maintained on both rails if the inner and the outer wheels rotate at different peripheral speeds. This is not possible on most fixed-axle railcars. Thus, under such conditions, the wheels undergo a combined rolling and sliding movement relative to the rails. Sliding movement may also arise when traction is lost on inclines thereby causing the driving wheels to slip.

The magnitude of the sliding movement is roughly dependent on the difference, expressed as a percentage, between the rail and wheel velocities at the point of contact. This percentage difference is termed creepage.

At creepage levels larger than about 1%, appreciable frictional forces are generated due to sliding, and these frictional forces result in noise and wear of components (H. Harrison, T. McCanney and J. Cotter (2000), Recent Developments in COF Measurements at the Rail/Wheel Interface, Proceedings The 5th International Conference on Contact Mechanics and Wear of Rail/Wheel Systems CM 2000 (SEIKEN Symposium No. 27), pp. 30-34, which is incorporated herein by reference). The noise emission is a result of a negative friction characteristic that is present between the wheel and the rail system. A negative friction characteristic is one wherein friction between the wheel and rail generally decreases as the creepage of the system increases in the region where the creep curve is saturated. Theoretically, noise and wear levels on wheel-rail systems may be reduced or eliminated by making the mechanical system very rigid, by reducing the frictional forces between moving components to very low levels or by changing the friction characteristic from a negative to a positive one, that is by increasing friction between the rail and wheel in the region where the creep curve is saturated. Unfortunately, it is often impossible to impart greater rigidity to a mechanical system, such as in the case of a wheel and rail systems used by most trains. Alternatively, reducing the frictional forces between the wheel and the rail may greatly hamper adhesion and braking and is not always suitable for rail applications. In many situations, imparting a positive frictional characteristic between the wheel and rail is effective in reducing noise levels, wear of components, decreasing drawbar force reduction, lateral force reduction, or a combination thereof.

U.S. Pat. No. 5,308,516, U.S. Pat. No. 5,173,204 and WO 90/15123 relate to solid friction control compositions having high and positive friction characteristics. These compositions display increased friction as a function of creepage, and comprise resins to impart the solid consistency of these formulations. The resins employed included amine and polyamide epoxy resins, polyurethane, polyester, polyethylene or polypropylene resins.

EP 0372559 relates to solid coating compositions for lubrication which are capable of providing an optimum friction coefficient to places where it is applied, and at the same time are capable of lowering abrasion loss.

U.S. Pat. No. 6,649,573, and US 2004/0043908 relate to solid lubricants comprising a thermoplastic polymeric carrier (low or high density polyethylene), an inorganic and organic powder lubricant, optionally a synthetic extreme pressure anti-wear liquid oil and optionally an optical brightener. Similarly, U.S. Pat. No. 4,915,856, U.S. Pat. No. 5,435,925 provide solid lubricants comprising a thermoplastic polymeric carrier and an oil, optionally a solid lubricant. These compositions are provided in a stick for application between the wheel and rail in wheel-rail systems. However, the solid lubricant stick exhibits extreme variability of consumption rate with varying temperature, a consistently low stick melting point and variability in lubricant loading. As a result, the resin may extrude between the flange of the wheel and the rail gauge face onto the top of the rail resulting in undesired top-or-rail contamination. Furthermore, as the thermoplastic polymeric carrier is a low or high density polyethylene, the solid lubricant sticks are prepared using an extrusion process and solid sticks so produced comprise flat ends. During use, as the stick is consumed, the end of the solid stick is not retained within the applicator which results in waste of the stick. The wasted portion of the stick will eventually fall out from the gap between the end of the applicator and the wheel, and may obstruct devices along a rail system, for example switches, and also has environmental implications.

SUMMARY OF THE INVENTION

The present invention relates to solid stick compositions for applying to surfaces which are in sliding or rolling-sliding contact.

It is an object of the present invention to provide a novel solid stick grease composition.

The present invention provides a solid stick composition comprising a thermosetting resin and a grease. Furthermore, the solid stick composition may comprise:

a) from about 20 to about 80 weight percent of the thermosetting resin;
b) from about 1 to about 80 weight percent of the grease;
c) from about 0 to about 30 weight percent thermosetting plasticizer;
d) from about 0 to about 30 weight percent solid lubricant; and
e) from about 0 to about 40 weight percent friction modifier.

The present invention also pertains to the solid stick composition as defined above, wherein the composition comprises from about 20 to about 60 weight percent grease. The composition may comprise from about 30 to about 70 weight percent thermosetting resin.

If the solid stick composition as defined above comprises a thermosetting plasticizer, the thermosetting plasticizer may selected from the group consisting of dioctyl phthalate, adipate, a polymeric plasticizer, a branched phthalate, linear phthalate, branched adipate, mixed dibasic acid polyester, trimellitate, polyester glutarate, polyester adipate, citrate, polymeric plasticizer, sebacates, adipic acid polyesters, dioctyl adipate, a soybean-based plasticizer, and mixtures thereof.

If the solid stick composition comprises an additional lubricant the lubricant may be selected from the group comprising molybdenum disulphide, graphite, aluminum stearate, zinc stearate, coal dust, carbon fibres, and a mixture thereof.

The present invention also provides a solid stick composition as defined above, wherein the resin is selected from the group consisting of epoxy novolac-based vinyl ester, brominated bisphenol-epoxy vinyl ester, vinyl polyester, bisphenol-epoxy vinyl ester, halogenated isophthalic polyester, isophthalic polyester, halogenated polyester, polystyrene, soybean-derived unsaturated polyester resin, corn resin, acrylated epoxidized soybean oil, epoxidized vegetable oil, maleinated soybean monoglyceride, maleinated hydroxylated soybean oil, natural fish oil, soybean oil, tung oil, and a blend or a combination thereof. Preferably, the thermosetting resin is a polyester or a vinyl ester.

The present invention also provides a method of controlling friction between a metal surface and a second metal surface by applying the composition as described above to one or more than one of the metal surfaces.

The present invention also pertains to a method of controlling friction between a metal surface and a second metal surface by applying the composition as described above to one or more than one of the metal surfaces.

The present invention provides a method of reducing lateral force in a rail system comprising applying the composition as described above onto a wheel or rail surface.

The present invention provides solid stick compositions that exhibit the property of controlling friction between steel surfaces, and may be used to reduce wear and energy consumption in rail systems.

Furthermore, the retentivity for the solid stick compositions of the present invention is superior to retentivity of known solid stick compositions of similar or increased hardness values. By increasing the retentivity and transfer rate of the composition onto a steel surface, an increased number of axels pass over the composition may be obtained prior to the removal of the composition from the steel surface. This results a longer portion of cars within a train exhibiting the benefits of the composition (e.g. reduced drawbar force, noise reduction, rail ware etc.), than that achieved for a composition that is applied with a lower rate of transfer.

By varying the hardness of the composition, the transfer rate of the composition to a steel surface may be modified.

This summary of the invention does not necessarily describe all features of the invention.

BRIEF DESCRIPTION OF THE DRAWINGS

These and other features of the invention will become more apparent from the following description in which reference is made to the appended drawings wherein:

FIG. 5 shows the change in coefficient of friction over time for solid stick compositions comprising thermosetting plasticizer in accordance with the present invention (FIGS. 5a-5d) compared to known solid stick compositions comprising thermoplastic polymeric carriers (FIGS. 5e-5f).

DETAILED DESCRIPTION

Figure 1:
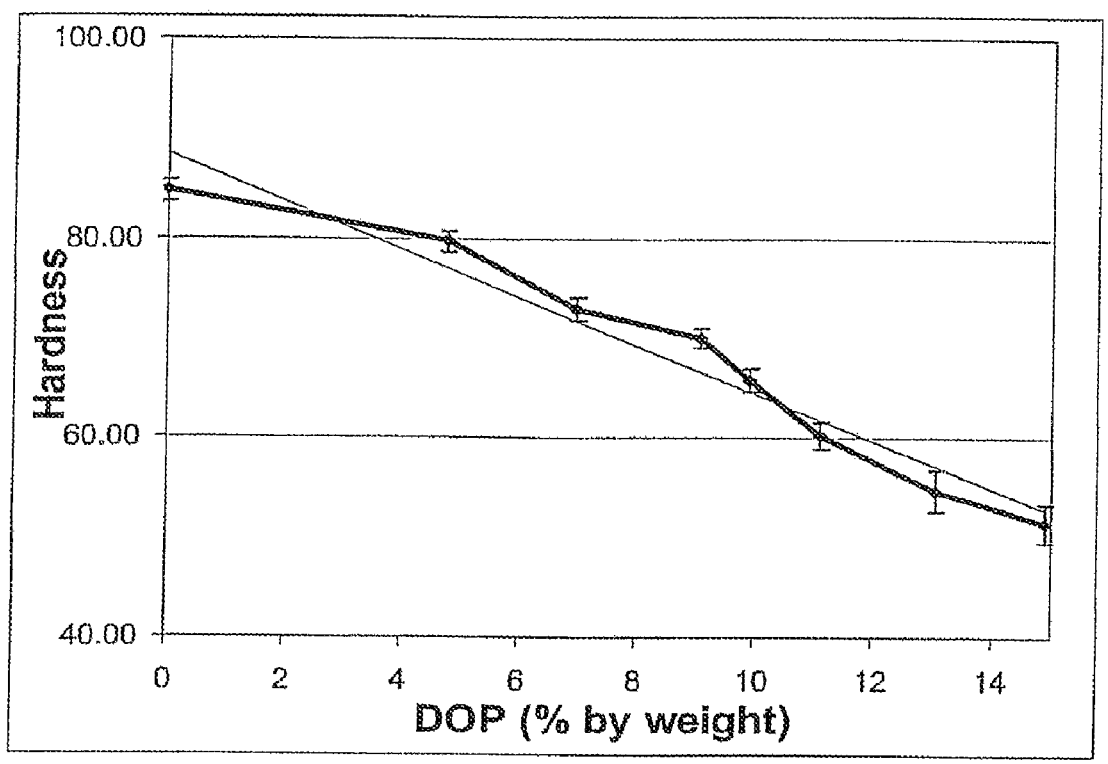
FIG. 1 shows the relationship between DOP content (% by weight of total composition) and stick hardness. DOP relates to a branched phthalate plasticizer BASF PALATINOL DOP™, which was added with increasing concentration to a standard solid stick formulation as given in Table 2 of the examples. The average hardness value for different concentrations of DOP and the standard deviation is given in FIG. 1.

The present invention relates to solid stick compositions for use on steel surfaces that are in sliding or rolling-sliding contact.

The following description is of a preferred embodiment.

The solid stick compositions of the present invention generally comprise a thermosetting plasticizer, a resin, a solid lubricant and optionally a friction modifier. Additionally, the solid stick compositions of the present invention may generally comprise a thermosetting a resin, a grease, and optionally a friction modifier.

The present invention provides a solid stick composition for use on steel surfaces that are in sliding or rolling-sliding contact. An example of a solid stick composition preferably comprises a thermosetting plasticizer, for example from about 3 to about 30 weight percent thermosetting plasticizer, a resin, for example, from about 20 to about 80 weight percent resin, a solid lubricant, for example from about 0 to about 80 weight percent lubricant, from about 0 to about 40% weight percent a friction modifier, or a combination of a solid lubricant and a friction modifier, wherein the solid stick comprises at least one of the lubricant or the friction modifier.

An alternate example of a solid stick composition comprises a thermosetting resin, for example, from about 20 to about 80 weight percent resin, a grease, for example from about 1 to about 80 weight percent grease, from about 0 to about 40% weight percent a friction modifier, and a thermosetting plasticizer, for example from about 0 to about 30 weight percent thermosetting plasticizer. If desired, from about 0-30 weight percent of a solid lubricant may also be added. Additional components, for example, preservatives, surfactants, colouring agents and the like may be added as required.

The co-efficient of friction may be measured using any suitable devise for example a push tribometer, or TriboRailer (H. Harrison, T. McCanney and J. Cotter (2000), Recent Developments in COF Measurements at the Rail/Wheel Interface, Proceedings The 5th International Conference on Contact Mechanics and Wear of Rail/Wheel Systems CM 2000 (SEIKEN Symposium No. 27), pp. 30-34, which is incorporated herein by reference).

As described herein, a composition having a Low Coefficient of Friction (LCF) can be characterized as having a coefficient of friction of less than about 0.2 when measured with a push tribometer. Preferably, under field conditions, LCF exhibits a coefficient of friction of about 0.2 or less. A positive friction characteristic is one in which friction between the wheel and rail systems increases as the creepage of the system increases. As described herein, a composition having a High Positive Friction (HPF) can be characterized as having a coefficient of friction from about 0.28 to about 0.4 when measured with a push tribometer. Preferably, under field conditions, HPF exhibits a coefficient of friction of about 0.35. A composition having a Very High Positive Friction (VHPF) can be characterized as having a coefficient of friction from about 0.45 to about 0.55 when measured with a push tribometer. Preferably, under field conditions, VHPF exhibits a coefficient of friction of 0.5. See WO 02/026919 (which is incorporated herein by reference) for examples of LCF, HPF and VHPF compositions.

When a lubricant or grease is included in the solid stick composition of the present invention without a friction modifier the composition will typically have a low coefficient of friction. Inclusion of a friction modifier in the solid stick composition of the present invention generally provides compositions with a high or very high coefficient of friction.

By the term 'positive friction characteristic', it is meant that the coefficient of friction (CoF) between two surfaces in sliding or rolling-sliding contact increases as the creepage between the two surfaces increases. The term 'creepage' is a common term used in the art and its meaning is readily apparent to someone of skill in the art. For example, in the railroad industry, creepage may be described as the percentage difference between the magnitude of the velocity of the sliding movement of a rail relative to the magnitude of the tangential velocity of the wheel at the point of contact between wheel and rail, assuming a stationary zone of contact and a dynamic rail and wheel.

Various methods in the art may be used to determine if a friction control composition exhibits a positive friction characteristic. For example, but not wishing to be limiting, in the lab a positive friction characteristic may be identified using a disk rheometer or an amsler machine ((H. Harrison, T. McCanney and J. Cotter (2000), Recent Developments in CoF Measurements at the Rail/Wheel Interface, Proceedings The 5th International Conference on Contact Mechanics and Wear of Rail/Wheel Systems CM 2000 (SEIKEN Symposium No. 27), pp. 30-34, which is incorporated herein by reference). Other two roller systems may be used to determine frictional control characteristics of compositions (e.g. A. Matsumo, Y. Sato, H. Ono, Y. Wang, M. Yamamoto, M. Tanimoto and Y. Oka (2000), Creep force characteristics between rail and wheel on scaled model, Proceedings The 5th International Conference on Contact Mechanics and Wear of Rail/Wheel Systems CM 2000 (SEIKEN Symposium No. 27), pp. 197-202; which is incorporated herein by reference). Sliding friction characteristics of a composition in the field, may be determined using for example but not limited to, a push tribometer.

Wheel squeal associated with a curved track may be caused by several factors including wheel flange contact with the rail gauge face, and stick-slip due to lateral creep of the wheel across the rail head. Without wishing to be bound by theory, lateral creep of the wheel across the rail head is thought to be the most probable cause of wheel squeal, while wheel flange contact with the rail gauge playing an important, but secondary role. Studies, as described herein, demonstrate that different friction control compositions may be applied to different faces of the rail-wheel interface to effectively control wheel squeal. For example, a composition with a positive friction characteristic as is known in the prior art, for example WO 02/26919 (which is incorporated herein by reference), or a solid stick composition of the present invention exhibiting a high (HPF) or very high (VHPF) coefficient of friction may be applied to the head of the rail-wheel interface to reduce lateral slip-stick of the wheel tread across the rail head, and a low friction control composition, for example as described in WO 02/26919, or a solid stick composition of the present invention exhibiting a low coefficient of friction (LCF), may be applied to the gauge face of the rail-wheel flange to reduce the flanging effect of the lead axle of a train car.

By the term 'plasticizer' or 'thermosetting plasticizer' it is meant a chemical, compound or mixture thereof which is capable of reducing the hardness of a solid stick composition. Preferably a thermosetting plasticizer is capable of reducing the hardness of the solid stick composition to below 85. Without wishing to be bound by theory, a reduced harness of the solid stick composition may increases transfer rate of the stick composition to the surface exposed to steel-to-steel contact.

Thermosetting plasticizers generally include, but are not limited to, dioctyl phthalate, adipate and a polymeric plasticizer. Dioctyl phthalate has the general formula:

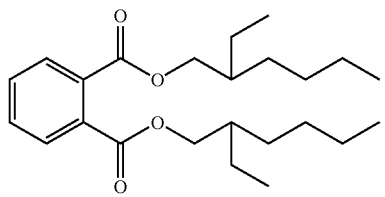

Adipates are dibasic esters based on adipic acid. An example of an adipate is dioctyl adipate, which has the general formula:

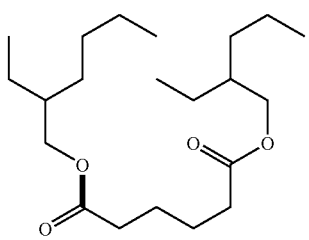

Polymeric plasticizers are chained polyesters based on dibasic acid esters such as adipates or glutarates and have the general formula:

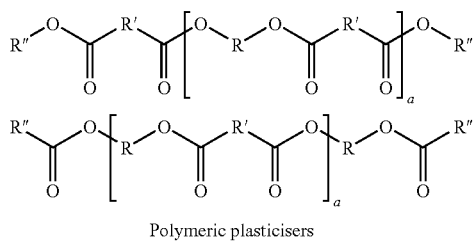

Polymeric plasticisers

Thermosetting plasticizers include, but are not limited to:
a branched phthalate, for example but not limited to BASF PALATINOL DOP™; BASF PALATINOL N™; BASF DINP™; mixtures of hexyl, octyl and decyl esters such as 610P ™; and bis-2-propylheptyl phthalate such as 10-P™
a linear phthalate, for example but not limited to BASF PALATINOL 7PHP™ and DUP/711 ™
a branched adipate, for example but not limited to BASF PLASTOMOLL DNA™ and CPH PLASTHALL DIDA™
a dioctyl adipate such as DOA™ and DOS™
a mixed dibasic acid polyester, for example but not limited to BASF PALAMOLL 652™ and CPH PARAPLEX G30™
a straight-chain dibasic acid-based plasticizers such as sebacates
a trimellitate, for example but not limited to CPH PLASTHALL 8-10 TME™; TOTM™; and a mixture of hexyl, octyl and decyl trimellitates such as 610TM™
a polyester glutarate, for example but not limited to CPH PLASTHALL P550™
a polyester adipate, for example but not limited to CPH PARAPLEX A8000™
a citrate, for example but not limited to MORFLEX CITROFLEX B-6™ and MORFLEX BTHC™
a polymeric plasticizer, for example but not limited to BASF™ Adipic Acid Polyester mixture
soybean-based plasticizer for example but not limited to DRAPEX 6.8 (Witco Corp) or Vikoflex epoxidized vegetable oil (Arkema).

The compositions of the present invention may comprise a thermosetting plasticizer at an amount that results in the solid stick composition being characterized as comprising a hardness (a property related to compression resistance, scratching resistance, and abrasion resistance) from about 40 to about 85 (determined at about 20° C.) or any amounts therebetween as measured using methods known to one of skill in the art, for example using a D-type Durometer. For example, a composition of the present invention may comprise a hardness of about 55 to about 70, or any amount therebetween, for example a hardness of 40, 53, 45, 47, 50, 53, 55, 56, 57, 58, 59, 60, 61, 62, 63, 64, 65, 66, 67, 68, 69, 70, 73, 75, 77, 80, 83 or 85, as determined at 20° C. Preferably the amount of plasticizer in the solid stick compositions of the present invention is from about 3 to about 30 weight percent, or any amount therebetween, for example, from about 5 to about 15 weight percent, or from about 7 to about 12 weight percent or any amount therebetween, for example but not limited to 3, 4, 5, 6, 7, 7.5, 8, 8.5, 9, 9.5, 10, 10.5, 11, 11.5, 12, 13, 14, or 15 weight percent plasticizer (thermosetting plasticizer). One or more than one wax, preferably a wax that is solid at room temperature, may also be added to the solid stick compositions of the present invention to assist in modifying the hardness of the final resin.

By the term 'resin' it is meant a chemical, compound or mixture thereof, which imparts the properties of viscosity to a composition that can be poured into preformed moulds and sets as a solid stick composition when cured. Resins include but are not limited to epoxy resin, polyurethane resin, polyurethane acrylic resin, polyester resin, thermosetting polyester resin, epoxy novolac-based vinyl ester (e.g. Derakane 470-300), brominated bisphenol-epoxy vinyl ester (e.g. DION FR 9300), vinyl polyester (e.g. DION VPE 7100-06), bisphenol-epoxy vinyl ester (e.g. DION VER 9100-00), halogenated isophthalic polyester (e.g. Heteron 99P), isophthalic polyester (DION FR 850-200), halogenated polyester (e.g. Polylite 33441-00), styrene, polystyrene, soybean-derived unsaturated polyester resin (e.g. Envirez 5000, or Envirez 1807, from Ashland), acrylated epoxidized soybean oil (AESO, e.g. Ebecryl 860, from UCB Chemicals Co., or Actilane 300 from Akzo Nobel), maleinated soybean monloglyceride (SOMG/MA), maleinated hydroxylated soybean oil (HSO/MA), corn resin, and natural fish, soybean, or tung oil in combination with other monomers for example, styrene, divinyl benzene, cyclopentadine or a combination of natural fish, soybean, or tung oil. Furthermore, resins may be combined as required and blends of these resins may be used. The use of natural oils (e.g. natural fish, soybean, or tung oil) for resin formulations may be desired for use to reduce environmental contamination or to increase utilization of renewable resources.

The amount of resin in the compositions of the present invention is from about 20 to about 80 weight percent, or any amount therebetween, for example, from about 25 to about 75 weight percent, from about 30 to about 70 weight percent, from about 35 to about 65 weight percent, from about 40 to about 60 weight percent, from about 45 to about 55 weight percent, and any amount therebetween, or about 20, 22, 24, 26, 28, 30, 32, 34, 36, 38, 40, 42, 44, 46, 48, 50, 52, 54, 56, 58, 60, 62, 64, 66, 68, 70, 72, 74, 76, 78 and 80 weight percent.

As would be known to one of skill in the art, a catalyst may be required to initiate the hardening process of a resin as described above. Examples of catalysts include, but are not limited to methylethylketone peroxide (for example but not limited to LUPEROX DDM-9™), n, n-dimethylamine, cobalt naphthenate (for example but not limited to NUXTRA COBALT 12%™), peroxy ester (e.g. USP 245; for use with acrylated epoxidized soybean oil), or boron trifluoride diethyl etherare (BEF; for use with natural oils, for example fish, soybean, and tung oils). The use of other catalysts, or the amount of catalyst to be added can be readily determined by one of skill in the art to modify the setting rate of the resin, and should not be considered limiting to the present invention in any manner.

By the term 'lubricant' it is meant a chemical, compound or mixture thereof which is capable of reducing the coefficient of friction between two surfaces in sliding or rolling-sliding contact. Solid lubricants include but are not limited to molybdenum disulfide, tungsten disulphide, graphite, boron nitride, boric acid, aluminum stearate, zinc stearate and carbon compounds such as, but not limited to coal dust, and carbon fibres. Preferably, the lubricants, if employed, in the solid stick compositions of the present invention are molybdenum disulfide, graphite or a mixture thereof.

The solid lubricant provided in the stick compositions of the present invention may comprise a mixture of graphite and molybdenum disulfide. The amount of graphite may exceed that of molybdenum disulphide, for example a graphite:molybdenum disulphide ratio from about 3:1 to about 1:1, or any ratio therebetween, for example 3:1, 2.8:1, 2.6:1, 2.4:1, 2.2:1, 2:1, 2.0:1, 1.8:1, 1.6:1, 1.4:1, 1.2:1, and 1.0:1. However, the amount of molybdenum may also exceed the amount of graphite within solid stick compositions of the present invention, for example the graphite:molybdenum disulphide ratio may also vary from about 1:3 to about 0:1, or any ratio therebetween, for example 1:3, 1:2.5, 1:2.3, 1:2.0, 1:1.7, 1:1.5, 1:1.3, 1:1, 0.8:1, 0.6:1, 0.5:1, 0.4:1, 0.2:1 and 0:1, or any amount therebetween.

Alternatively, a grease, or a combination of greases, may be used within the solid stick compositions of the present invention. Any suitable grease may be used, including commercially available greases, vegetable-oil based greases, for example soybean, canola, sunflower, corn oils. The grease may also comprise additives for use under extreme pressure (EP additives) for example, molybdenum disulfide, graphite and a combination thereof, and anti-oxidants. Examples of greases that may be used include, but not limited to SoyTrack™ (available from Portec Rail), CITIGO Summer Railroad Curve Grease No. 1, CITIGO Winter Railroad Curve Grease No. 0, Marinus Rail Curve Grease, Petro Canada Rail Curve Grease, Whitmore Railmaster, Railmaster LF, Railmaster LFG, Biorail, Shell Cardura, Alvania EP D, Cyprina RA, Texaco Grease 904, Maraton Moly EP. However, it is to be understood that other grease formulations or suitable oils may also be used within the solid stick compositions as described herein. Examples of oils that may be used include hydrocarbon based oils, ester oils, vegetable-based oils (see for example U.S. Pat. No. 5,972,855) and the like. Furthermore, combinations of greases, or combinations of grease, oil, and other lubricants, for example molybdenum disulfide, graphite or a mixture thereof may also be used.

The amount of grease within the stick compositions of the present invention may range from about 0 to about 80 weight %, or any amount therebetween. For example, the solid stick composition may comprise from about 0, 2, 4, 6, 8, 10, 12, 14, 16, 18, 20, 22, 24, 26, 28, 30, 32, 34, 36, 38, 40, 42, 44, 46, 48, 50, 52, 54, 56, 58, 60, 62, 64, 66, 68, 70, 72, 74, 76, 78 or 80 weight percent, or any amount therebetween of grease. Preferably, if grease is present within the solid stick composition, the grease is present from about 10 to about 60 weight percent or any amount therebetween. For example, the grease may be present from about 25 to about 50 weight percent or any amount therebetween.

By the term 'friction modifier' it is meant a material which imparts a positive friction characteristic to the friction control composition of the present invention, or one which enhances the positive friction characteristic of a liquid friction control composition when compared to a similar composition which lacks a friction modifier. The amount of friction modifier present in the solid stick composition may be from 0 to about 40 weight percent, or any amount therebetween, for example from about 5 to about 40 weight percent or any amount therebetween, from about 15 to about 35 weight percent or any amount therebetween, or 0, 2, 4, 6, 8, 10, 12, 14, 16, 18, 20, 22, 24, 26, 28, 30, 32, 34, 36, 38 and 40 weight percent.

The friction modifier preferably comprises a powderized mineral and has a particle size in the range of about 0.5 microns to about 10 microns. Further, the friction modifier may be soluble, insoluble or partially soluble in water and preferably maintains a particle size in the range of about 0.5 microns to about 10 microns after the composition is deposited on a surface and the liquid component of the composition has evaporated. Friction modifiers, described in U.S. Pat. No. 5,173,204 and W098/13445 (which are incorporated herein by reference) may be used in the composition described herein. Friction modifiers may include, but are not limited to:

Whiting (Calcium Carbonate)
Magnesium Carbonate
Talc (Magnesium Silicate)
Bentonite (Natural Clay)
Dust (Ground Coal)
Blanc Fixe (Calcium Sulphate)
Asbestors (Asbestine derivative of asbestos)
China Clay; Kaolin type clay (Aluminium Silicate)
Silica—Amorphous (Synthetic)
Naturally occurring
Slate Powder
Diatomaceous Earth
Zinc Stearate
Aluminium Stearate
Magnesium Carbonate
White Lead (Lead Oxide)
Basic Lead Carbonate
Zinc Oxide
Antimony Oxide
Dolomite (MgCo CaCo)
Calcium Sulphate
Barium Sulphate (e.g. Baryten)
Polyethylene Fibres Aluminum Oxide
Magnesium Oxide
Zirconium Oxide
or combination thereof.

The compositions of the present invention may include a lubricant, a grease, a friction modifier, or a combination thereof, at an amount that results in the composition being characterized as comprising a coefficient of friction of from about 0.1 to about 0.26, or any amounts therebetween, for example, a composition of the present invention may comprise a coefficient of friction of about 0.10, 0.12, 0.14, 0.16, 0.18, 0.20, 0.22, 0.24, or 0.26 when measured for example using the Amsler machine. For example, the amount of lubricant in the compositions of the present invention may be from about 20 to about 80 weight percent, or any amount therebetween, for example, from about 25 to about 75 weight percent, from about 30 to about 70 weight percent, from about 35 to about 65 weight percent, from about 40 to about 60 weight percent, and from about 45 to about 55 weight percent, or any amount therebetween. As an alternate example, the solid stick composition may comprise a grease from about 1 to about 80 weight percent, or any amount therebetween, for example, from about 25 to about 75 weight percent, from about 30 to about 70 weight percent, from about 35 to about 65 weight percent, from about 40 to about 60 weight percent, and from about 45 to about 55 weight percent, or any amount therebetween.

The solid stick compositions of the present invention may optionally include other components, such as but not limited to, colour additives, wax to reduce tackiness of the set resin (for example up to 5% by weight wax in styrene), or to assist in reduction of hardness, viscosity reducing agents, for example acetone, preservatives, consistency modifiers, defoaming agents, styrene and rheological control agents, either alone or in combination.

The solid stick compositions of the present invention may be loaded into an applicator for use when being applied against a steel surface. The applicator may be provided with a spring-loaded mechanism against which the stick is loaded. The spring-loaded mechanism provides pressure against the stick during application so that the stick is available for application to a steel surface. Non-limiting examples of straight applicators include those disclosed in U.S. Pat. No. 4,811,818, U.S. Pat. No. 5,054,582, U.S. Pat. No. 5,251,724, U.S. Pat. No. 5,337,860, US 2003 0101897 (which are all incorporated herein by reference), and those available from Kelsani Technologies (North Vancouver, Canada). Circular applicators may also be used with the solid stick compositions of the present invention. An example of a circular applicator includes, but is not limited to those available from Kelsan Technologies (North Vancouver, Canada).

It is preferred that the solid sticks used within either straight or circular applicators are shorter than the length of the applicator and comprise a means for positively interfacing with other solid sticks present within the applicator. Such a positive interface may include a first end of the solid stick comprising a recess, while the second end comprises an extension that matingly engages the recess. Such a configuration ensures that solid sticks when inserted within the applicator positively engage the stick already in place within the applicator thereby retaining the stick within the applicator until it is consumed. This results in little or no waste of the stick during use as additional sticks may be inserted within the applicator and all of the prior stick is advanced against the steel surface. In the absence of the positive interface, small block of unused solid stick remains within the applicator prior to, or after, reloading and the last portion of the stick typically falls out of the applicator between the gap of the applicator and wheel surface, This wasted portion of stick may obstruct devises used along a rail track, for example switches, or wheels moving over a steel rail, and this waste also has environmental implications.

A solid stick design comprising the extension and recess as described above, for positive engagement may be produced using a molding process. Solid sticks that are produced by extrusion, for example, solid sticks comprising low or high density polyethylene as a thermoplastic polymeric carrier, comprise flat ends resulting ill the problems defined above relating to waste and possible obstruction of switches. The solid stick compositions of the present invention are produced using a molding process and preferably comprise a first end comprising a recess, and a second end comprising an extension that matingly engages the recess so as to produce a positive engagement between the stick when in use in the applicator.

When a solid stick composition is applied against a steel surface in rolling-sliding contact with another steel surface, for example a steel rail wheel moving over a steel track, the temperature of the system increases and temperatures of about 100° C. to about 180° C. are readily achieved. Under conditions of increased temperature, solid lubricants comprising a thermoplastic polymeric carrier (e.g. a low or high density polyethylene), exhibit rapid changes in hardness (see FIG. 4; compare LDP1 and LDP 2 which comprise a polymeric carrier, with GMP1-GMP4, comprising the thermosetting plasticizer of the present invention), and increased consumption rate and waste due to melting of the solid stick composition is observed. As described in the examples below, solid stick compositions comprising a polymeric carrier that melt under operating temperatures also exhibit excess removal of the composition which builds up on the trailing edge of the stick. This build up of composition no longer interacts effectively with the steel surface and leads to waste. The use of solid stick compositions comprising a thermoplastic polymeric carrier under these conditions results in variability of loading of the composition onto the steel surface, and consumption. Due to the variability in loading, the thermoplastic containing resins call potentially extrude between the flange of the wheel and the gauge face of the rail causing undesired top-of-rail contamination. However, the solid stick compositions of the present invention comprising a thermosetting plasticizer and resin do not melt under elevated temperature conditions (see FIG. 4), and a uniform loading of the composition onto a steel surface is maintained (FIG. 3; GMP 1).

Retentivity may be defined as the duration a solid stick composition is able to maintain a coefficient of friction value below 0.4 between two steel surfaces. However, other variables for expressing retentivity may also be considered, and retentivity may also be defined in terms of, for example but not limited to, the duration of maintaining a drawbar force, or lateral force, at a desired, or reduced amount. Retentivity may be expressed in units of time, for example how long a friction control composition exhibits the desired property under a constant experimental condition (e.g. determined using the Amsler machine, see FIGS. 5a-5f, or 6a and 6b), by removal rate, or in terms of number of axel passes.

Retentivity of a composition may be determined using an amsler machine or other suitable device and noting the number of cycles that an effect is maintained. Furthermore, in the railroad industry retentivity may be measured as a function of the number of axle passes for which a desired effect, such as, but not limited to sound reduction, drawbar force reduction, lateral force reduction, or frictional level, is maintained, or by using a push tribometer.

Furthermore, as described herein, it has been noticed that retentivity for the solid stick compositions of the present invention is superior to retentivity of known solid stick compositions of similar or increased hardness values. With increased retentivity and increased transfer rate, the solid stick composition of the present invention advantageously reduce lateral forces and reduce energy consumption in a rail system when the composition is applied to one or more than one of the metal surfaces in the system. Without wishing to be bound by theory, by increasing the transfer rate of the composition onto a steel surface, an increased number of axels pass over the composition may be realized prior to the removal of the composition from the rail surface. This results in the benefits of the composition (e.g. reduced drawbar force, noise reduction, rail ware etc.), being realized along a longer portion of a collection of cars in a train than for a composition that is applied with a lower rate of transfer. This property is observed using an Amsler machine, where increased retentivity may be realized by maintaining a reduction in the coefficient of friction over an increased number of cycles, or time. For example, compare the time that a reduced coefficient of friction is maintained using a solid stick composition of the prior art comprising a thermoplastic low or high density polyethylene as a polymeric carrier (FIGS. 5e and 5f, less than about 300 sec), with a solid stick composition of the present invention comprising the thermosetting plasticizer as described herein (FIGS. 5a-5d; 400-850 sec).

As described herein, solid stick compositions may be produced comprising a range of hardness (see FIGS. 1 and 4) of from about 40 to about 85 (determined at 20° C.) or any amount therebetween. By varying the hardness of the composition, the transfer rate of the composition to a steel surface may be modified. In this manner, if an increase in the amount of composition on a steel surface is desired, then a stick comprising a lower hardness may be employed. Alternatively, if it is desired that the composition be applied over a longer portion of a steel surface, then a stick characterized by an increased hardness may be used. Similarly, under conditions of increased sliding between steel-to-steel surfaces, where an increase in temperature is anticipated, a stick characterized with an increased hardness may be used.

The solid stick composition of the present invention may also comprise a grease incorporated within a resin. Resin based compositions provide the benefits described above, including the molding of the resin-grease composition into a desired shape for use within an applicator, the use of interlocking features within the molded shape to ensure reduced waste and breakage during use, and the use of a resin ensures that composition will not melt during use. Furthermore, by using a resin, for example a resin that sets at room temperature, the resin-grease mixtures can be prepared without the need for extensive ventilation that is required if a thermoplastic resin (requiring temperatures from about 160° C. to about 200° C.) is formulated with a grease. Manufacture of a grease-resin composition at room temperature greatly simplifies the process.

Non-limiting examples of room temperature-setting resins that may be used for solid stick compositions comprising grease include polyester and vinyl ester resins, for example, halogenated isophthalic polyester (e.g. Heteron 99P), isophthalic polyester (DION FR 850-200), halogenated polyester (e.g. Polylite 33441-00), polystyrene, soybean-derived unsaturated polyester resin (e.g. Envirez 5000, or Envirez 1807, from Ashland). The addition of grease to the resin modifies the hardness of the composition Depending upon the amount of grease used within the grease-resin composition, the hardness of the stick may be adjusted for example, by adding an additive or thermosetting plasticizer to the mixture. For example, in compositions comprising low amounts of grease, for example about 1-10, or 1-20 weight %, an additive or thermosetting plasticizer may be added to achieve a desired hardness. Additionally, friction modifiers, lubricants, surfactants, colourants may be added as required.

Without wishing to be bound by theory, by mixing the grease within the resin, the grease is dispersed so that upon setting, the grease is encapsulated by the resin. The encapsulation of the grease by the resin provides a continuous supply of the grease to a steel surface during use, yet the resin ensures an appropriate hardness of the solid stick can be obtained.

A benefit associated with the use of the solid stick compositions of the present invention is the reduction of energy consumption as measured by, for example but not limited to, drawbar force, associated with steel-rail and steel-wheel systems of freight and mass transit systems. The reduction of energy consumption has an associated decrease in operating costs. The reduction of energy costs or reduced lateral forces, associated with the use of applying compositions against a rail surface are known, see for example, WO 02/026919 (which is incorporated herein by reference).

The solid stick compositions of the present invention may further comprise components that one of skill in the art will appreciate may be substituted or varied without departing from the scope and spirit of the present invention. In addition, it is fully contemplated that the solid stick compositions of the present invention may be used in combination with other lubricants or friction control compositions. For example, but not wishing to be limiting, the compositions of the current invention may be used with other friction control compositions such as, but not limited to those disclosed in U.S. Pat. No. 5,308,516; U.S. Pat. No. 5,173,204; WO 02/26919, and US Publication 2003 0195123 and 2004 038831 (which are incorporated herein by reference).

The present invention will be further illustrated in the following examples. However, it is to be understood that these examples are for illustrative purposes only, and should not be used to limit the scope of the present invention in any manner.

EXAMPLE 1

Preparation of Solid Stick Compositions

Standard Manufacturing Process for Solid Stick Compositions:

A thermosetting plasticizer, for example but not limited to dioetyl phthalate, dioctyl adipate, or a polymeric plasticizers, may be added under stirring to a promoter mixture comprising resin, for example but not limited to HETRON 99P™, in a large vat or drum. The solid lubricant, for example graphite, molybdenum disulphide, a friction modifier, or a mixture thereof, is then slowly added to the mixture and dispersed into the resin. Other components may be added to the mixture, for example but not limited to n, n-dimethylamine (DMA) or Nuxtra Cobalt 12%. Further ingredients may also be added to the mixture including, but not limited to, styrene and additional friction modifiers or enhancers. The mixture is typically mixed at high speed (for example but not limited to 20 psi air pressure) for a period of time (for example but not limited to 2 hours), followed by an overnight period of low-speed mixing (for example but not limited to 10 psi air pressure). Testing may be performed on the pre-cured formulation, ensuring specific gravity, viscosity and curing time fall within particular quality assessment specifications. The mixture is then pumped into a pressurized nozzle together with a catalyst, for example but not limited to methylethylketone peroxide (e.g. LUPEROX DDM-9™). Pre-heated open moulds are filled with the resultant mixture. The moulds are inverted and the cured sticks removed. Post-curing quality assessment test may be performed on the cured sticks.

Selection of a Thermosetting Plasticizer

TABLE 1

Exemplary List of Thermosetting Plasticizers*

| Name | Chemical Structure |
|---|---|
| BASF PALATINOL DOP ™ | Branched phthalate |
| BASF PALATINOL N ™ | Branched phthalate |
| BASF PALATINOL 7PHP ™ | Linear Phthalate |
| BASF PLASTOMOLL DNA ™ | Branched Adipate |
| BASF PALAMOLL 652 ™ | Mixed Dibasic Acid Polyester |
| CPH PLASTHALL DIDA ™ | Branched Adipate |
| CPH PLASTHALL 8-10 TME ™ | Trimellitate |
| CPH PLASTHALL P550 ™ | Polyester Glutarate |
| CPH PARAPLEX G30 ™ | Mixed Dibasic Acid Polyester |
| CPH PARAPLEX A8000 ™ | Polyester Adipate |
| MORFLEX CITROFLEX B-6 ™ | Citrate |

*this list is not to be considered limiting in any manner as other thermosetting plasticizers may also be used for example a soybean-based plasticizer, Drapex 6.8 (Witco Corp).

A range in amounts of the plasticizers given in Table 1 were incorporated into the standard formulation given in Table 2 by addition to the resin-cobalt mixture under stirring prior to addition of styrene and DMA. The plasticizer either replaced the equivalent amount of resin by weight in order that the amount of lubricant in the composition remained the same, or was added to the composition to and reduced both the amount of resin and lubricant in order to retain a constant amount of the lubricant to resin, as indicated below (Table 3).

TABLE 2

Composition of a low coefficient of friction (LCF) solid stick

| Component | Percentage by Weight (%) | Full Batch Amount (kg) |
|---|---|---|
| HETRON 99P ™ resin | 44.49 | 249.59 |
| NUXTRA COBALT ™ 12% | 0.30 | 1.68 |
| Styrene | 3.20 | 17.95 |
| DMA | 0.03 | 0.17 |
| CLIMAX ™ Technical Grade molybdenum disulphide ($MoS_2$) | 51.98 | 291.61 |

The resultant mixture was mixed at high speed (20 psi air pressure) for two hours followed by overnight mixing at low speed (10 psi air pressure). Tests were performed on the pre-cured formulations, ensuring specific gravity, viscosity and curing time fell within specific quality assessment specifications. The mixture was then pumped into a pressurized nozzle together with LUPEROX DDM-9™ methylethylketone peroxide catalyst. Pre-heated moulds were filed with the formulation and after 4 minutes the moulds were emptied and the cured sticks removed. The sticks were left to dry and harden overnight and next morning quality assessment tests were performed.

The hardness of the cured sticks was tested using a D-type Durometer, which comprises pressing the Durometer against the sample, and measuring a material resistance force. The depth of the indentor is measured, which provides a measure of the material's hardness. Values are based upon a 100 point scale (accuracy ±1 point). The results are given in Table 3.

TABLE 3

Hardness of sticks comprising different plasticizers

| Plasticizer | Percentage by weight (%) | Hardness Results |
|---|---|---|
| BASF PALATINOL DOP ™ | 9 | 65.1 ± 2 |
| BASF PALAMOLL 652 ™ | 9 | 65.4 ± 1 |
| BASF PALATINOL N ™* | 9.91 | 66.0 ± 1 |
| BASF PALATINOL 7PHP ™* | 10.71 | 64.6 ± 1 |
| BASF PLASTOMOLL DNA ™* | 9.09 | — |
| MORFLEX CITROFLEX B-6 ™ | 9 | — |
| CPH PARAPLEX A8000 ™ | 9 | 60.6 ± 1 |
| CPH PARAPLEX G30 ™ | 9 | 68.0 ± 2 |
| CPH PLASTHALL P550 ™ | 9 | 62.7 ± 2 |
| CPH PLASTHALL DIDA ™ | 9 | — |
| CPH PLASTHALL 8-10 TME ™ | 9 | 70.6 ± 2 |

*Addition with constant resin- $MoS_2$ ratio instead of constant $MoS_2$ content.

Graphite-$MoS_2$-Plasticizer Compositions

The solid lubricant may comprise graphite, molybdenum disulphide ($MoS_2$) or preferably a combination of both graphite and molybdenum disulphide ($MoS_2$). Table 4 shows the Graphite-$MoS_2$-Plasticizer solid stick compositions prepared using the method given above. The hardness of each stick was measured using a D-type Durometer.

TABLE 4

Graphite-$MoS_2$-Plasticizer solid stick compositions

| COMPONENTS | | | |
|---|---|---|---|
| Graphite Type/% by weight | Lubricant* % by weight | Plasticizer** % by weight | HARDNESS |
| TIMCAL 20 × 50 ™/ 25.5% | 14.5% | 9% | 61.0 ± 3 |
| TIMCAL 50 × 80 ™/ 25.5% | 14.5% | 9% | 60.5 ± 1 |
| TIMCAL 80 × 150 ™/ 25.5% | 14.5% | 9% | 61.5 ± 2 |
| SUPERIOR GRAPHITE 5020-L ™/ 28.9% | 11.1% | 9% | 66.5 ± 2 |
| TIMCAL 50 × 80 ™/ 30.5% | 14.5% | 9% | 50.8 ± 1 |
| TIMCAL 20 × 50 ™/ 25.5% | 14.5% | 7% | 64.9 ± 2 |
| TIMCAL 50 × 80 ™/ 25.5% | 14.5% | 7.5% | 63.8 ± 2 |
| TIMCAL 80 × 150 ™/ 25.5% | 14.5% | 7% | 65.7 ± 1 |
| SUPERIOR GRAPHITE 5020-L ™/ 28.9% | 11.1% | 10% | 64.2 ± 1 |
| TIMCAL 50 × 80 ™/ 30.5% | 14.5% | 6% | 63.2 ± 1 |

*CLIMAX ™ Tech Grade $MoS_2$
**PALAMOLL 652 ™

A comparison of the different graphite samples used is given in Table 5 below.

TABLE 5

Comparison of Graphite Samples

| Sample | Type | d50 (micron) | d90 (micron) | Purity (%) |
|---|---|---|---|---|
| TIMCAL ™ | | | | |
| 80 × 150 | Flake | 150 | 240 | 94-98 |
| 50 × 80 | Flake | 240 | 300 | 94-98 |
| 20 × 50 | Flake | 400 | 700 | 94-98 |
| SUPERIOR GRAPHITE ™ | | | | |
| 5020-L | Synthetic | 110 | 250 | 99 |

A further graphite sample that may be used in the stick composition is SUPERIOR GRAPHITE 8201™.

EXAMPLE 2

Characterization of Plasticizer Solid Stick Compositions

Effect of Plasticizer Addition on Hardness and Density

Different amounts (as a weight % of the total composition) of a dioctyl phthalate plasticizer (BASF PALATINOL DOP™) were incorporated into the standard formulation given in Table 2. The DOP was added whilst maintaining the resin-$MoS_2$ ratio constant and decreasing the absolute content of both. The hardness and density of the resultant cured sticks was measured. Stick hardness was measured using a D-type Durometer (as outlined in Example 1).

FIG. 1 shows the relationship between DOP content (% by weight of total composition) and stick hardness. A linear relationship between DOP content and stick hardness of from about 45 to 85 is observed, with an increase in DOP content leading to a proportional decrease in stick hardness.

Figure 2:
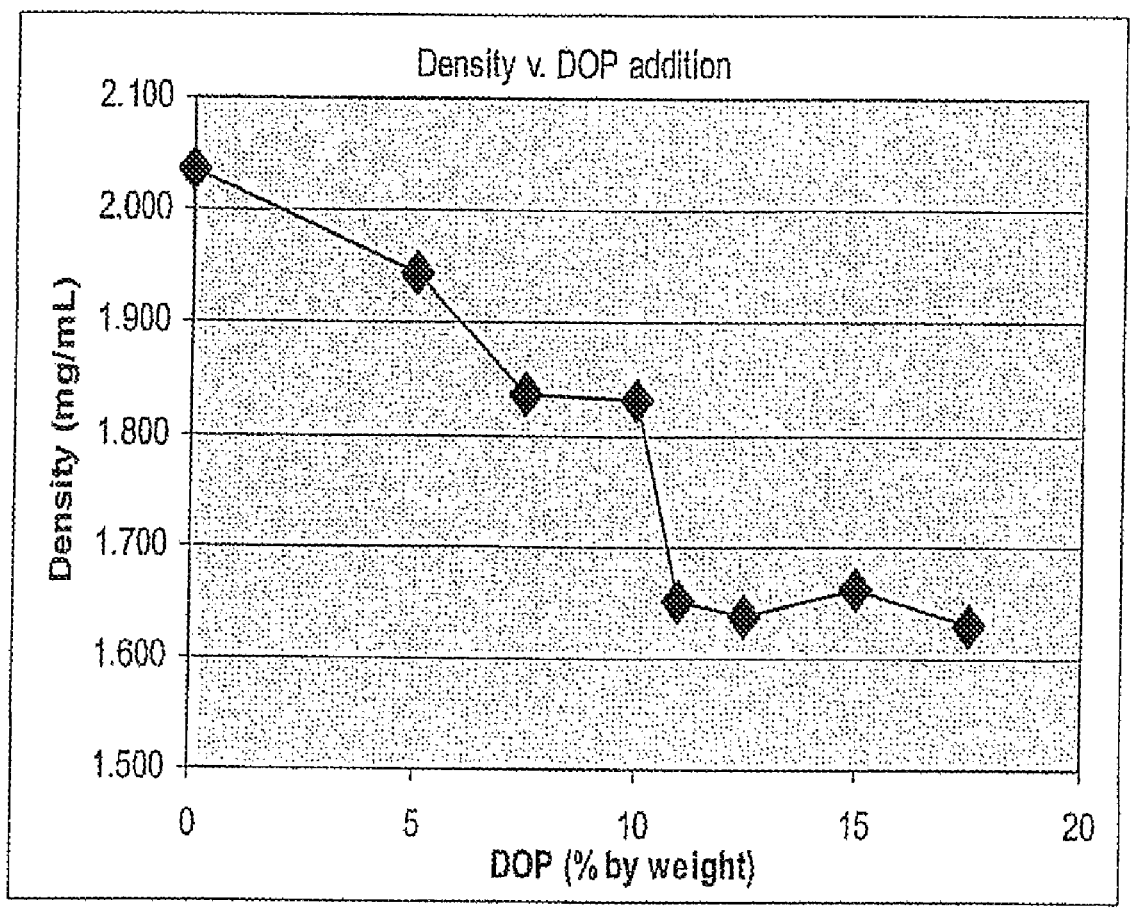
FIG. 2 shows the relationship between DOP content (% by weight of total composition) and stick density (mg/ml). DOP relates to a branched phthalate plasticizer BASF PALATINOL DOP™, which was added with increasing concentration to a standard solid stick formulation as given in Table 2 of the examples, The density value in mg/ml for different concentrations of DOP is given in FIG. 1.

FIG. 2 shows the relationship between DOP content (% by weight of total composition) and stick density (mg/ml). FIG. 2 indicates that stick density decreases with increasing DOP added.

EXAMPLE 3

Comparison of Plasticizer Solid Stick Compositions with Known Solid Stick Compositions The following Graphite-$MoS_2$-Plasticizer (GMP) solid stick compositions from Table 4 were selected for further testing:

GMP 1 comprising 25.5% TIMCAL 80×150™ graphite; 14.5% $MoS_2$; 7% PALAMOLL 652™; with a hardness of 65.7

GMP 2 comprising 25.5% TIMCAL 20×50™ graphite; 14.5% $MoS_2$; 7% PALAMOLL 652™; with a hardness of 64.9;

GMP 3 comprising 25.5% TIMCAL 5×80™ graphite; 14.5% $MoS_2$; 7.5% PALAMOLL 652™; with a hardness of 63.8; and GMP 4 comprising 28.9% SUPERIOR GRAPHITE 5020-L™; 11.1% $MoS_2$; 10% PALAMOLL 652™; with a hardness of 64.2.

The GMP sticks were compared to a known Low Coefficient of Friction (LCF) stick comprising the components given in Table 2, prepared in the absence of a plasticizer, and also to four different known stick compositions generally comprising between 10%-60% solid lubricant (as a mixture of graphite and molybdenum disulphide) and comprising a high density polyethylene added to reduce the hardness of the stick to about 65. The solid stick compositions comprising the low density polyethylene are labeled as LDP 1, LDP2, LDP 3 and LDP4.

The GMP sticks were found to have comparable density to the LDP sticks, with LCF having the highest relative density value.

Stick Consumption Rate

Figure 3:
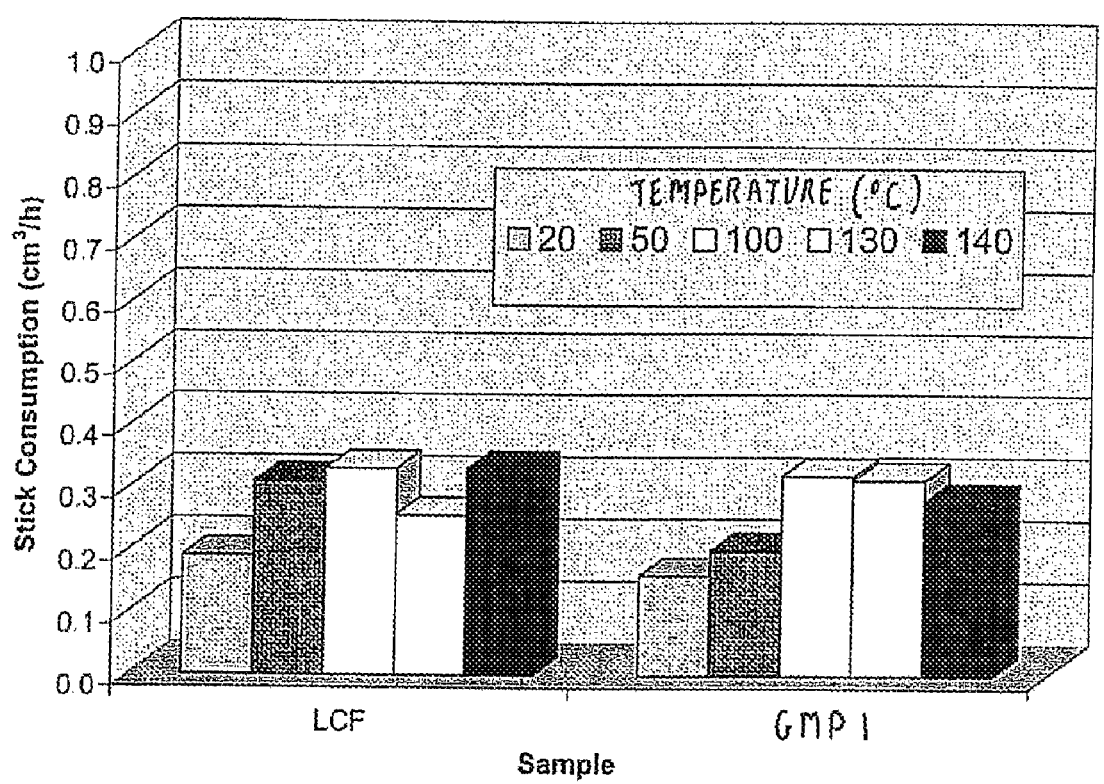
FIG. 3 shows the consumption rate ($cm^3/h$) of a stick comprising 25.5% TIMCAL 80×150™ graphite—14.5% Molybdenum Disulphide—7% BASF PALAMOLL 652™ with a hardness of 65.7 (GMP 1) and a known standard Low Coefficient of Friction (LCF) stick comprising the components given in Table 2 of the Examples The consumption rate of each stick was measured using a stick testing apparatus (STA) at a range of temperatures (20° C., 50° C., 100° C., 130° C. and 140° C.).

The consumption rate of GMP 1 was compared to LCF using a stick testing apparatus (STA) at a range of different temperatures (from 20° C.-140° C.). In this test, a sample is applied, under a known pressure, to a main wheel which is conditioned to a known surface roughness. During the test the main wheel rotates at a speed of 32 kph and sand is introduced onto the surface of the main wheel via a sand trickler. A nib wheel is applied to the main wheel at a pressure of 138 Kpa, and the sample is tested for 60 min with displacement measurements obtained during this time period. The results are shown in FIG. 3.

Wear of GMP 1 (comprising a thermosetting plasticizer) is comparable to, or below, the wear of the LCF (comprising no plasticizer) across the range of temperatures tested (about 0.1-0.3 $cm^3$/h). GMP 1 was consumed evenly with no material collecting at the edges of the stick over the temperature range. Similar tests with LPD 1 and LDP 2 (compositions comprising a thermoplastic polymeric carrier) resulted in high rates of consumption above temperatures of 130° C. (about 1 $cm^3$/h at 130° C. and about 2-4 $cm^3$/h at 140° C.). Melting of the stick and collection of material at the trailing edges of the stick forming a lip was also observed. The LPD 1 and 2 compositions therefore exhibit uneven consumption rates at different temperatures encountered under field conditions.

Stick Hardness Over Temperature Range

The hardness of GMP 1, GMP 2, GMP 3 and GMP 4 over a range of temperatures from 20° C. to 250° C. was compared to the hardness values for LCF and LDP 1, LDP 2, LDP 3 and LDP 4 over a range of temperatures from 20° C. to 140° C. The results are shown in FIG. 4 (only the results for LDP 1 and LDP 2 are shown in FIG. 4, the results for LDP 3 and LDP4 were the same as LDP1 and LDP2).

Figure 4:
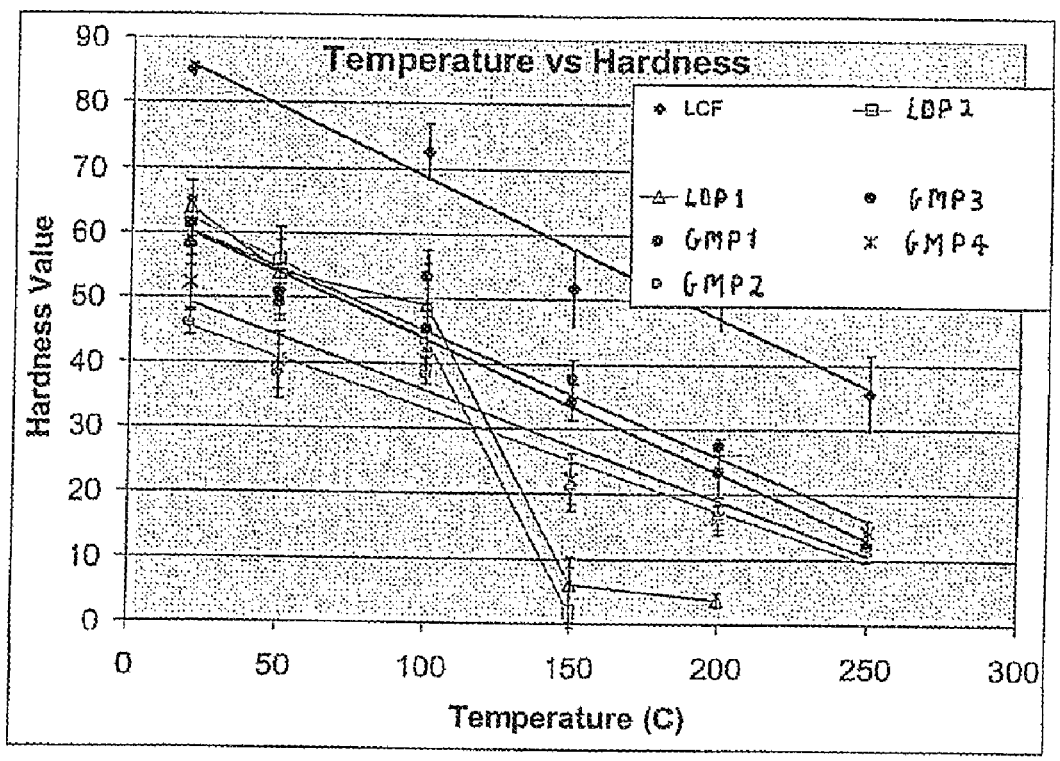
FIG. 4 shows the hardness value over a range of temperatures between 20° C. and 250° C. measured using a D-type Durometer for different solid stick compositions comprising a thermosetting plasticizer in accordance with the present invention (GMP 1 comprising 25.5% TIMCAL 80×150™ graphite—14.5% $MoS_2$—7% PALAMOLL 652™); (GMP 2 comprising 25.5% TIMCAL 20×50™ graphite—14.5% $MoS_2$—7% PALAMOLL 652™); (GMP 3 comprising 25.5% TIMCAL 50×80™ graphite—14.5% $MoS_2$—7.5% PALAMOLL 652™); (GMP 4 comprising 28.9% SUPERIOR GRAPHITE 5020-L™—11.1% $MoS_2$—10% PALAMOLL 652™) compared to known solid stick compositions (LCF a Low Coefficient of Friction stick comprising the components given in Table 2 of the examples); and (LPD 1 and LPD 2 generally comprising between 10%-60% solid lubricant (mixture of graphite and molybdenum disulphide) and a thermoplastic high density polyethylene).
Figure 5A:
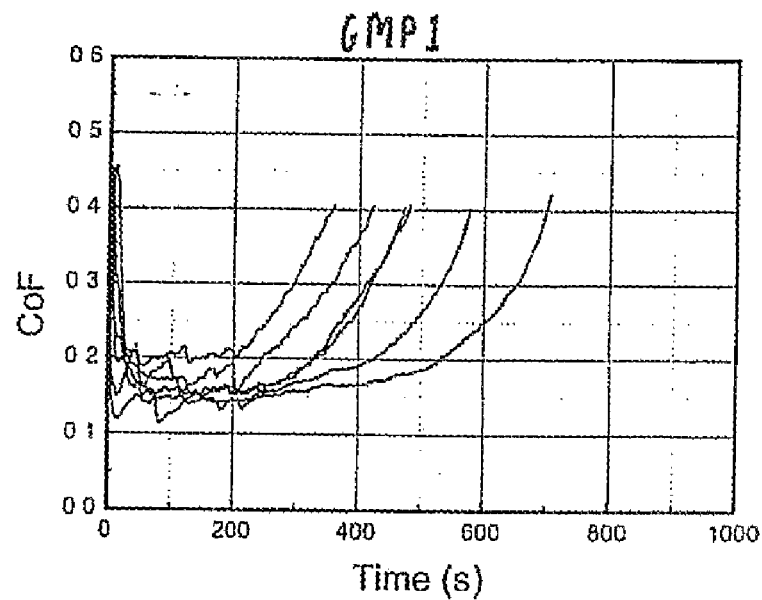
FIG. 5a shows the change in coefficient of friction over time for solid stick composition GMP 1 comprising 25.5% TIMCAL 80×150™ graphite—14.5% $MoS_2$—7% PALAMOLL 652™ with a hardness of 65.7.
Figure 5B:
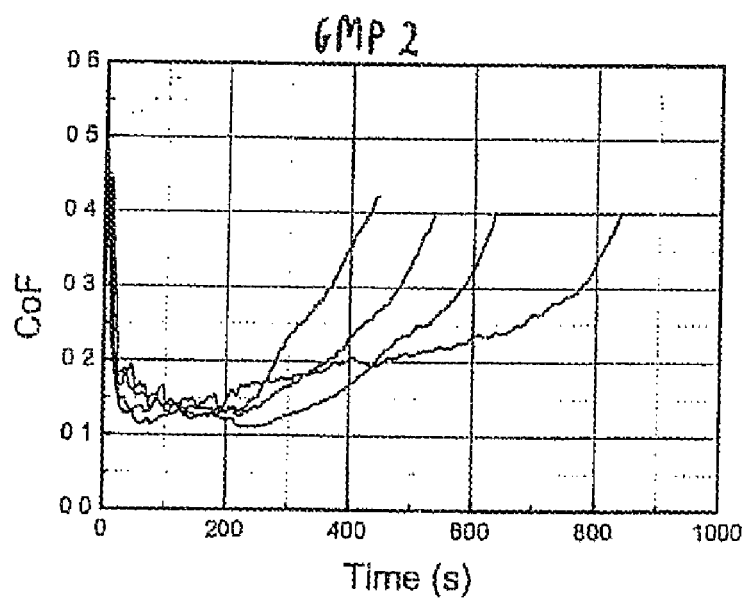
FIG. 5b shows the change in coefficient of friction over time for solid stick composition GMP 2 comprising 25.5% TIMCAL 20×50™ graphite—14.5% $MoS_2$—7% PALAMOLL 652™ with a hardness of 64.9.
Figure 5C:
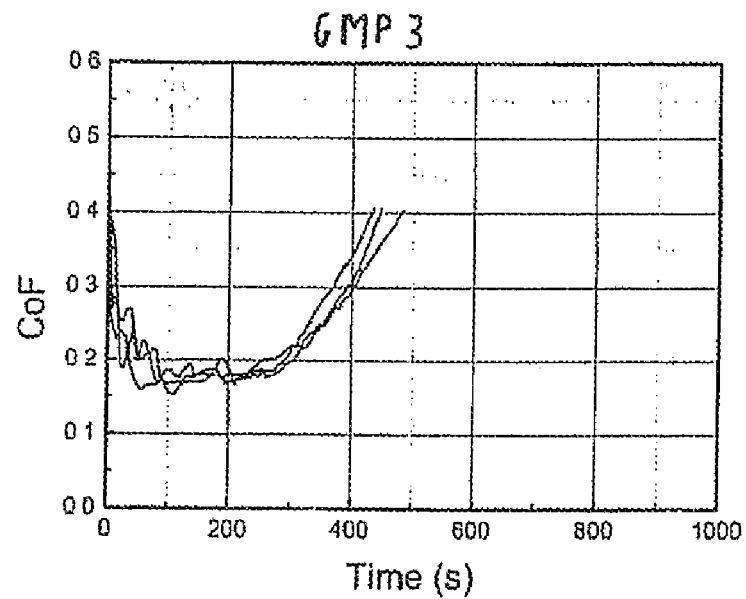
FIG. 5c shows the change in coefficient of friction over time for solid stick composition GMP 3 comprising 25.5% TIMCAL 50×80™ graphite—14.5% $MoS_2$—7.5% PALAMOLL 652™ with a hardness of 63.8.
Figure 5D:
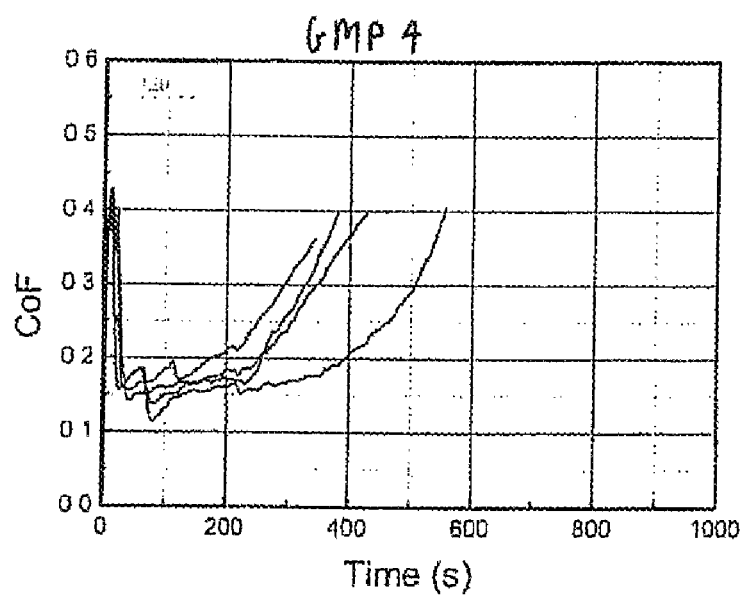
FIG. 5d shows the change in coefficient of friction over time for solid stick composition GMP 4 comprising 28.9% SUPERIOR GRAPHITE 5020-L™—11.1% $MoS_2$—10% PALAMOLL 652™ with a hardness of 64.2.
Figure 5E:
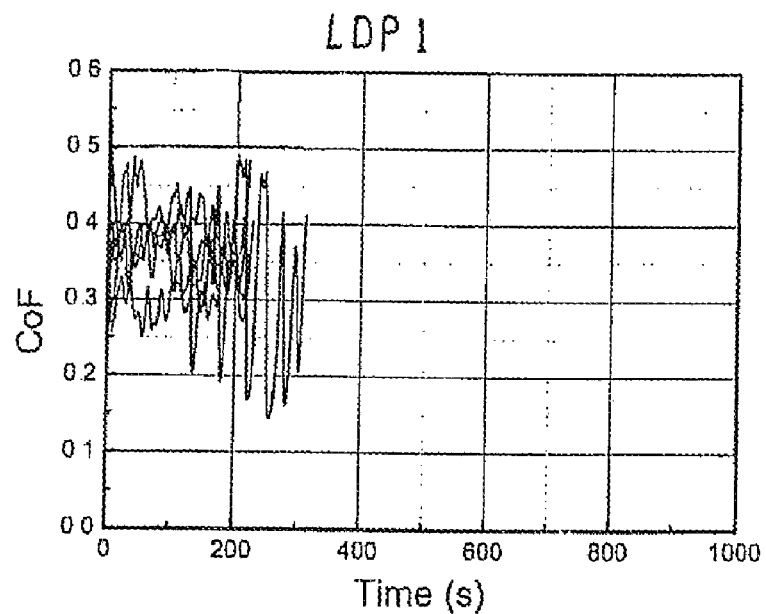
FIGS. 5e and 5f show the change in coefficient of friction over time for solid stick compositions LPD 1 and LPD 2 respectively, generally comprising between 10%-60% solid lubricant (mixture of graphite and molybdenum disulphide) and a thermoplastic high density polyethylene with a hardness of about 65.
Figure 5F:
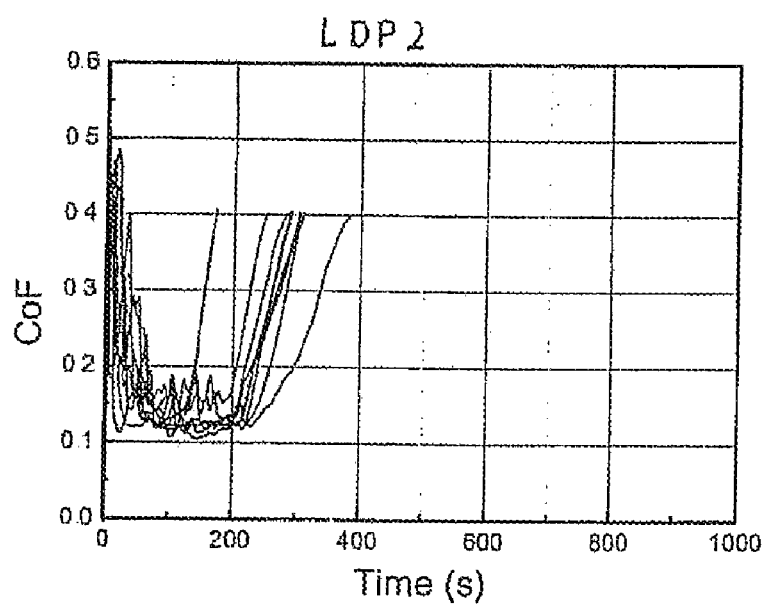

As can be seen in FIG. 4, the hardness values for LPD 1 and LDP 2 sharply decreases at temperatures between 100° C. to 150° C. In contrast, the hardness values for LCF and GMP 1-4 decreases in a linear, predictable manner for temperatures up to 250° C., with the hardness value for these sticks steadily decreasing as the temperature increases.

Solid sticks comprising the composition of Table 2 and from 10 to 15% by weight, plasticizer were prepared and the hardness (as measured above) and consumption rate determined. The results are shown in Table 6.

TABLE 6

Solid stick hardness and consumption rates

| DOP Content of Original sample (% w/w) | Mass loss (g/h) | Hardness (24 hrs after manufacture) |
|---|---|---|
| 10 | 0.93 | 70.1 ± 1 |
| 11 | 0.65 | 65.9 ± 1 |
| 12.5 | 1.14 | 60.3 ± 1 |
| 15 | 1.24 | 54.6 ± 2 |

By increasing the amount of plasticizer within the composition, the hardness of the sticks decreases, along with an increase in the rate of consumption of the stick.

Amsler Protocol

Retentivity of a composition on a steel surface may be tested using the Amsler machine. This device simulates the contact between the wheel of a train and the rail, and measures the coefficient of fiction between the two bodies over time. The Amsler machine uses two different discs to simulate the wheel and rail. The two discs are kept in contact by an adjustable spring at a constant force. A stick composition is applied to a clean disc in a controlled manner for example, for a desired period of time under a standard spring pressure.

A load is applied from about 680 to 745 N, in order to obtain a similar Hertzian Pressure (MPa) over different creep levels resulting from the use of different diameter disc combinations. Unless otherwise indicated, tests are performed at 3% creep level (disc diameters 53 mm and 49.5 mm). For all disc size combinations (and creep levels from 3 to 30%) the speed of rotation is 10% higher for the lower disc than the upper disc. The coefficient of friction is determined using a computer from the torque measured by the Amsler machine. The test is carried out until the coefficient of friction reaches 0.4, and the number of cycles or time (in seconds) is determined for each tested composition.

Retentivity and Friction Coefficient

The Amsler Protocol was conducted to determine the coefficient of friction obtained through application of GMP 1, GMP 2, GMP 3, GMP 4, LDP 1, and LDP 2. The results are given in FIGS. 5a-5f and indicate that the GMP sticks have a superior retentivity time compared to the LDP sticks that have a comparable hardness value. Furthermore, a stable friction coefficient of 0.15-0.20 was obtained during Amsler testing of the four GMP sticks, which is lower than the stable friction coefficient obtained for LPD 1 and LPD 2.

EXAMPLE 4

Solid Stick Compositions Comprising Grease

Solid stick compositions comprising grease were prepared by admixing grease within a resin. The viscosity of the grease may be adjusted to ensure proper mixing of the grease with the resin. The viscosity may be adjusted by adding an oil or by heating the grease prior to mixing. Additives to the resin-grease mixture may be added at this point, for example, molybdenum disulfide, graphite, or a combination thereof, followed by the catalyst. The mixture is poured into a mold of desired shape and the resin mixture allowed to cure at the desired temperature. If room-temperature setting resins are employed, then mixing and curing may take place at room temperature.

Figure 6A:
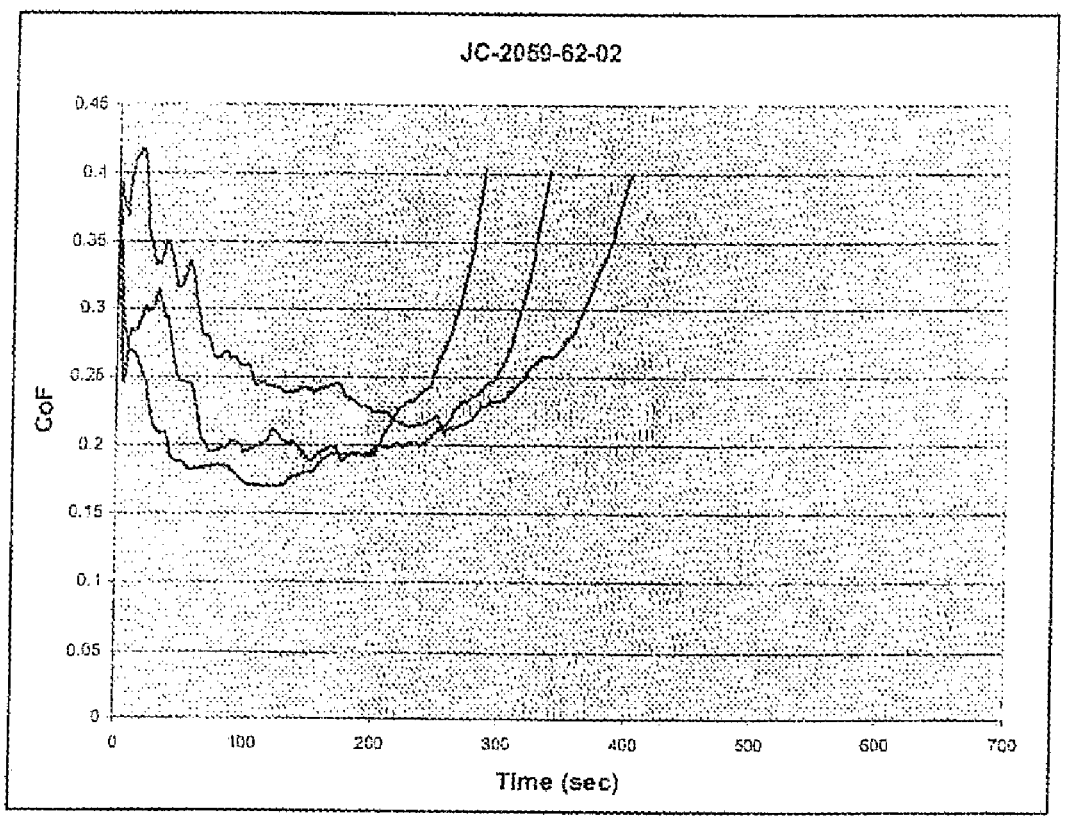
FIG. 6 shows the change in the coefficient of friction over time for solid stick compositions comprising 40% grease, (FIG. 6a—JC-2059-62-02.
FIG. 6b JC-2059-64-01) within a thermosetting resin.
Figure 6B:
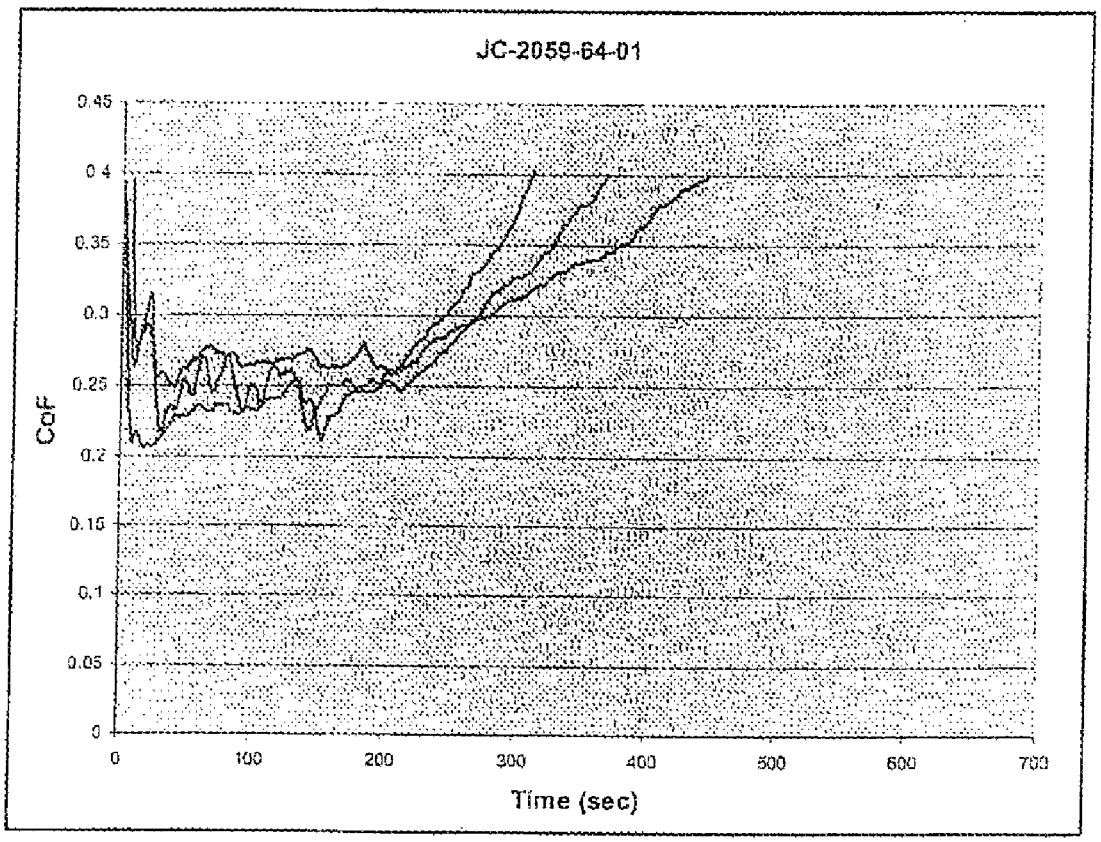

Non-limiting examples of solid stick compositions comprising Shell Cardura grease (JC-2059-62-02), or SoyTrack™ (JC-2059-62-01), are provided in Tables 7 and 8, respectively. Amsler results, performed as outlined in Example 3, using these compositions are shown in FIGS. 6a and 6b.

TABLE 7

Solid Stick Composition comprising Shell Cardura grease JC-2059-62-02

| Additive | % by Weight | Weight (g) | 17" stick (g) |
|---|---|---|---|
| Envirez 1807 Resin | 59.54% | 178.62 | 714.47 |
| Cobalt 2-Ethylhexanoate | 0.41% | 1.23 | 4.94 |
| Dimethylphenylamine | 0.05% | 0.15 | 0.60 |
| Shell Cardura Grease | 40.00% | 120.00 | 480.00 |
| Total | 100.00% | 300.00 | 1200.00 |

TABLE 8

Solid Stick Composition comprising SoyTrack ™ JC-2059-64-01

| Additive | % by Weight | Weight (g) | 17" stick (g) |
|---|---|---|---|
| Envirez 1807 Resin | 59.54% | 178.62 | 714.47 |
| Cobalt 2-Ethylhexanoate | 0.41% | 1.23 | 4.94 |
| Dimethylphenylamine | 0.05% | 0.15 | 0.60 |
| SoyTrack | 40.00% | 120.00 | 480.00 |
| Total | 100.00% | 300.00 | 1200.00 |

As demonstrated by the Amsler tests, solid stick composition comprising grease exhibit a friction coefficient of 0.17-0.20.

All references are herein incorporated by reference.

The present invention has been described with regard to preferred embodiments. However, it will be obvious to persons skilled in the art that a number of variations and modifications call be made without departing from the scope of the invention as described herein. In the specification the word "comprising" is used as an open-ended term, substantially equivalent to the phrase "including but not limited to", and the word "comprises" has a corresponding meaning. Citation of references is not an admission that such references are prior art to the present invention.

The embodiments of the invention in which an exclusive Property of privilege is claimed are defined as follows:

1. A solid stick composition comprising:
    a) from about 20 to about 80 weight percent thermosetting resin;
    b) from about 1 to about 80 percent grease, the grease encapsulated by the resin without any intervening substances,
    c) from about 0 to about 30 weight percent thermosetting plasticizer;
    d) from about 0 to about 30 weight percent solid lubricant; and
    e) from about 0 to about 40 weight percent friction modifier.

2. The solid stick composition of claim 1, wherein the composition comprises from about 20 to about 60 weight percent grease.

3. The solid stick composition of claim 1, wherein the composition comprises from about 30 to about 70 weight percent thermosetting resin.

4. The solid stick composition of claim 1, wherein the composition comprises from about 3 to about 20 weight percent thermosetting plasticizer.

5. The solid stick composition of claim 1, wherein the composition comprises from about 1 to about 10 weight percent solid lubricant.

6. The solid stick composition of claim 1, wherein the composition comprises from 0 to about 30 weight percent friction modifier.

7. The solid stick composition of claim 4, wherein the thermosetting plasticizer is selected from the group consisting of dioctyl phthalate, adipate, and a polymeric plasticizer.

8. The solid stick composition of claim 4, wherein the thermosetting plasticizer is a polymeric thermosetting plasticizer.

9. The solid stick composition of claim 4, wherein the thermosetting plasticizer is selected from the group consisting of branched phthalate, linear phthalate, branched adipate, mixed dibasic acid polyester, trimellitate, polyester glutarate, polyester adipate, citrate, polymeric plasticizer, sebacates, adipic acid polyesters, dioctyl adipate, a soybean-based plasticizer, and mixtures thereof.

10. The solid stick composition of claim 5, wherein the lubricant is selected from the group comprising molybdenum disulphide, graphite, aluminum stearate, zinc stearate, coal dust, carbon fibres, and a mixture thereof.

11. The solid stick composition of claim 5, wherein the lubricant is selected from the group consisting of graphite, molybdenum disulphide and a mixture thereof.

12. The solid stick composition of claim 6, wherein the friction modifier is present at an amount of from 5 to about 20 weight percent.

13. The solid stick composition of claim 1, wherein the thermosetting resin is selected from the group consisting of epoxy novolac-based vinyl ester, brominated bisphenol-epoxy vinyl ester, vinyl polyester, bisphenol-epoxy vinyl ester, halogenated isophthalic polyester, isophthalic polyester, halogenated polyester, soybean-derived unsaturated polyester resin, corn resin, acrylated epoxidized soybean oil, maleinated soybean monoglyceride, maleinated hydroxylated soybean oil, corn resin, natural fish oil, natural soybean oil, natural tung oil, or a combination thereof.

14. The solid stick composition of claim 1, wherein the thermosetting resin is a polyester or a vinyl ester.

15. A method of controlling friction between a metal surface and a second metal surface by applying the composition of claim 1 to one or more than one of the metal surfaces.

16. The method of claim 15, wherein the metal surface is a rail surface or wheel.

17. A method of reducing lateral force in a rail system comprising applying the composition of claim 1 onto a wheel or rail surface.

18. A method of reducing energy consumption in a rail system comprising applying the composition of claim 1 onto a wheel or rail surface.

* * * * *